(12) United States Patent
Patil et al.

(10) Patent No.: US 9,246,983 B2
(45) Date of Patent: Jan. 26, 2016

(54) METHOD AND APPARATUS FOR WIDGET COMPATIBILITY AND TRANSFER

(75) Inventors: Yashwant Vishnu Patil, Bangalore (IN); Kalle Markus Petteri Ojala, Lempäälä (FI); Sreejumon Purayil, Bangalore (IN); Gösta Christoffer Lunden, Espoo (FI); Samuli Yrjänä Ylinen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/640,345

(22) PCT Filed: Mar. 30, 2011

(86) PCT No.: PCT/FI2011/050268
§ 371 (c)(1),
(2), (4) Date: Feb. 5, 2014

(87) PCT Pub. No.: WO2011/128501
PCT Pub. Date: Oct. 20, 2011

(65) Prior Publication Data
US 2014/0201803 A1    Jul. 17, 2014

(30) Foreign Application Priority Data
Apr. 15, 2010 (IN) .......................... 1056/CHE/2010

(51) Int. Cl.
*H04L 29/08* (2006.01)
*G06F 9/445* (2006.01)
(Continued)

(52) U.S. Cl.
CPC ............ *H04L 67/06* (2013.01); *G06F 9/44505* (2013.01); *G06F 9/4856* (2013.01); *H04L 63/20* (2013.01)

(58) Field of Classification Search
CPC ..... H04L 67/06; H04L 63/20; G06F 9/44505; G06F 9/4856
USPC .............................................................. 726/1
See application file for complete search history.

(56) References Cited

U.S. PATENT DOCUMENTS 7,392,483 B2 *  6/2008  Wong ..................... G06F 8/38
                                                    715/744
2003/0067485 A1   4/2003  Wong et al.
(Continued)

FOREIGN PATENT DOCUMENTS

WO      2009109980          9/2009
WO      2009109980 A2       9/2009
(Continued)

OTHER PUBLICATIONS

Ahmadi et al., Collaborative End-User Development on Handheld Devices, Sep. 2008, IEEE Symposium on Visual Languages and Human-Centric Computing, pp. 237-241.*
(Continued)

*Primary Examiner* — Kenneth Chang
(74) *Attorney, Agent, or Firm* — Ditthavong & Steiner, P.C.

(57) ABSTRACT

An approach is provided for utilizing widgets compatible with multiple platforms. A request is received to transmit a widget associated with at first canvas to a second canvas. The first canvas and the second canvas include a respective runtime environment. A compatibility of the widget with the runtime environment of the second canvas is determined. Transmission of the widget is caused, at least in part, based, at least in part, on the determination.

23 Claims, 10 Drawing Sheets

(51) Int. Cl.
*G06F 9/48* (2006.01)
*H04L 29/06* (2006.01)

(56) References Cited

U.S. PATENT DOCUMENTS

| | | | |
|---|---|---|---|
| 2004/0216128 A1* | 10/2004 | Elzbieta | H04L 29/06 719/313 |
| 2006/0048141 A1 | 3/2006 | Persson et al. | |
| 2007/0078953 A1* | 4/2007 | Chai et al. | 709/219 |
| 2007/0130541 A1* | 6/2007 | Louch et al. | 715/804 |
| 2008/0040681 A1* | 2/2008 | Synstelien et al. | 715/765 |
| 2008/0098290 A1* | 4/2008 | Williams et al. | 715/209 |
| 2008/0168391 A1* | 7/2008 | Robbin et al. | 715/810 |
| 2009/0094339 A1 | 4/2009 | Allen et al. | |
| 2009/0248883 A1* | 10/2009 | Suryanarayana et al. | 709/229 |
| 2009/0249321 A1* | 10/2009 | Mandyam et al. | 717/171 |
| 2010/0197219 A1* | 8/2010 | Issa | H04H 20/57 455/3.06 |
| 2010/0262953 A1* | 10/2010 | Barboni et al. | 717/120 |

FOREIGN PATENT DOCUMENTS

| | | |
|---|---|---|
| WO | 2009120595 | 10/2009 |
| WO | 2009120595 A2 | 10/2009 |

OTHER PUBLICATIONS

International Search Report received for corresponding Patent Cooperation Treaty Application No. PCT/FI2011/050268, dated Jul. 6, 2011, 7 pages.
European Office Action for related European Application No. 11768505.7-1954 dated Jul. 11, 2014, 7 pages.

\* cited by examiner

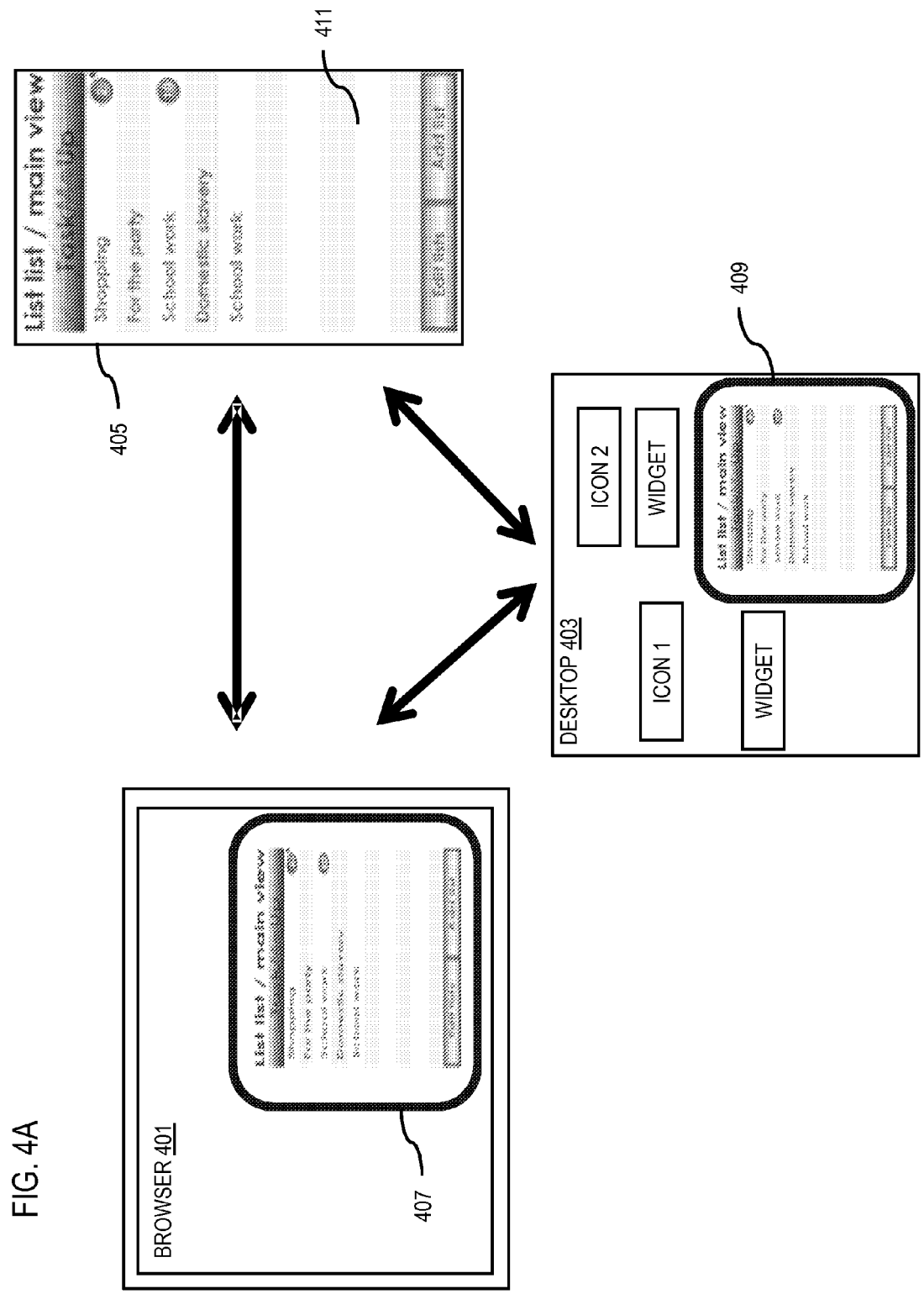

METHOD AND APPARATUS FOR WIDGET COMPATIBILITY AND TRANSFER

RELATED APPLICATION

This application was originally filed as PCT Application No. PCT/FI2011/050268 filed Mar. 30, 2011, which claims priority benefit to Indian Patent Application No. 1056/CHE/2010 filed Apr. 15, 2010.

BACKGROUND

Service providers and device manufacturers (e.g., wireless, cellular, etc.) are continually challenged to deliver value and convenience to consumers by, for example, providing compelling network services and advancing underlying technologies. Many of the services being offered by service providers are provided to users of devices via different platforms such as devices and/or operating systems. In general, service providers are required to code and/or compile different versions of applications or widgets used to provide the services on the devices of the users. As such, many service providers generate desktop widgets for desktop computers and additionally generate separate widgets for other devices such as mobile devices, tablets, etc. There is a need to generate separate widgets for each of these platforms because of incompatibilities of components of the devices such as user interfaces, processing power, software features, etc. As a result, service providers and device manufacturers face significant technical challenges in providing services via multiple platforms.

SOME EXAMPLE EMBODIMENTS

Therefore, there is a need for an approach for utilizing widgets compatible with multiple platforms.

According to one embodiment, a method comprises receiving a request to transmit a widget associated with a first canvas to a second canvas, the first canvas and the second canvas including a respective runtime environment. The method also comprises determining a compatibility of the widget with the runtime environment of the second canvas. The method further comprises causing, at least in part, transmission of the widget based, at least in part, on the determination.

According to another embodiment, an apparatus comprising at least one processor, and at least one memory including computer program code, the at least one memory and the computer program code configured to, with the at least one processor, cause, at least in part, the apparatus to receive a request to transmit a widget associated with a first canvas to a second canvas, the first canvas and the second canvas including a respective runtime environment. The apparatus is also caused to determine a compatibility of the widget with the runtime environment of the second canvas. The apparatus is further caused to cause, at least in part, transmission of the widget based, at least in part, on the determination.

According to another embodiment, a computer-readable storage medium carrying one or more sequences of one or more instructions which, when executed by one or more processors, cause, at least in part, an apparatus to receive a request to transmit a widget associated with a first canvas to a second canvas, the first canvas and the second canvas including a respective runtime environment. The apparatus is also caused to determine a compatibility of the widget with the runtime environment of the second canvas. The apparatus is further caused to cause, at least in part, transmission of the widget based, at least in part, on the determination.

According to another embodiment, an apparatus comprises means for receiving a request to transmit a widget associated with a first canvas to a second canvas, the first canvas and the second canvas including a respective runtime environment. The apparatus also comprises means for determining a compatibility of the widget with the runtime environment of the second canvas.

The apparatus further comprises means for causing, at least in part, transmission of the widget based, at least in part, on the determination.

For various example embodiments of the invention, the following is applicable:
A method comprising:
facilitating a processing of and/or processing: (1) data and/or (2) information and/or (3) at least one signal;
the (1) data and/or (2) information and/or (3) at least one signal based at least in part on (or derived at least in part from) any one or any combination of methods (or processes) disclosed in this application as relevant to any embodiment of the invention.

For various example embodiments of the invention, the following is applicable:
A method comprising facilitating access to at least one interface configured to allow access to at least one service, the at least one service configured to perform any one or any combination of network or service provider methods (or processes) disclosed in this application.

For various example embodiments of the invention, the following is applicable:
A method comprising facilitating creating and/or facilitating modifying: (1) at least one device user interface element and/or (2) at least one device user interface functionality;
the (1) at least one device user interface element and/or (2) at least one device user interface functionality based at least in part on the following:
data and/or information resulting from one or any combination of methods or processes disclosed in this application as relevant to any embodiment of the invention and/or
at least one signal resulting from one or any combination of methods (or processes) disclosed in this application as relevant to any embodiment of the invention.

For various example embodiments of the invention, the following is applicable:
A method comprising creating and/or modifying: (1) at least one device user interface element and/or (2) at least one device user interface functionality;
the (1) at least one device user interface element and/or (2) at least one device user interface functionality based at least in part on the following:
data and/or information resulting from one or any combination of methods (or processes) disclosed in this application as relevant to any embodiment of the invention and/or
at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams of user interfaces utilized in the processes of FIGS. 3A and 3B, according to various embodiments;

DESCRIPTION OF SOME EMBODIMENTS

Examples of a method, apparatus, and computer program for generating and utilizing widgets compatible with multiple platforms are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
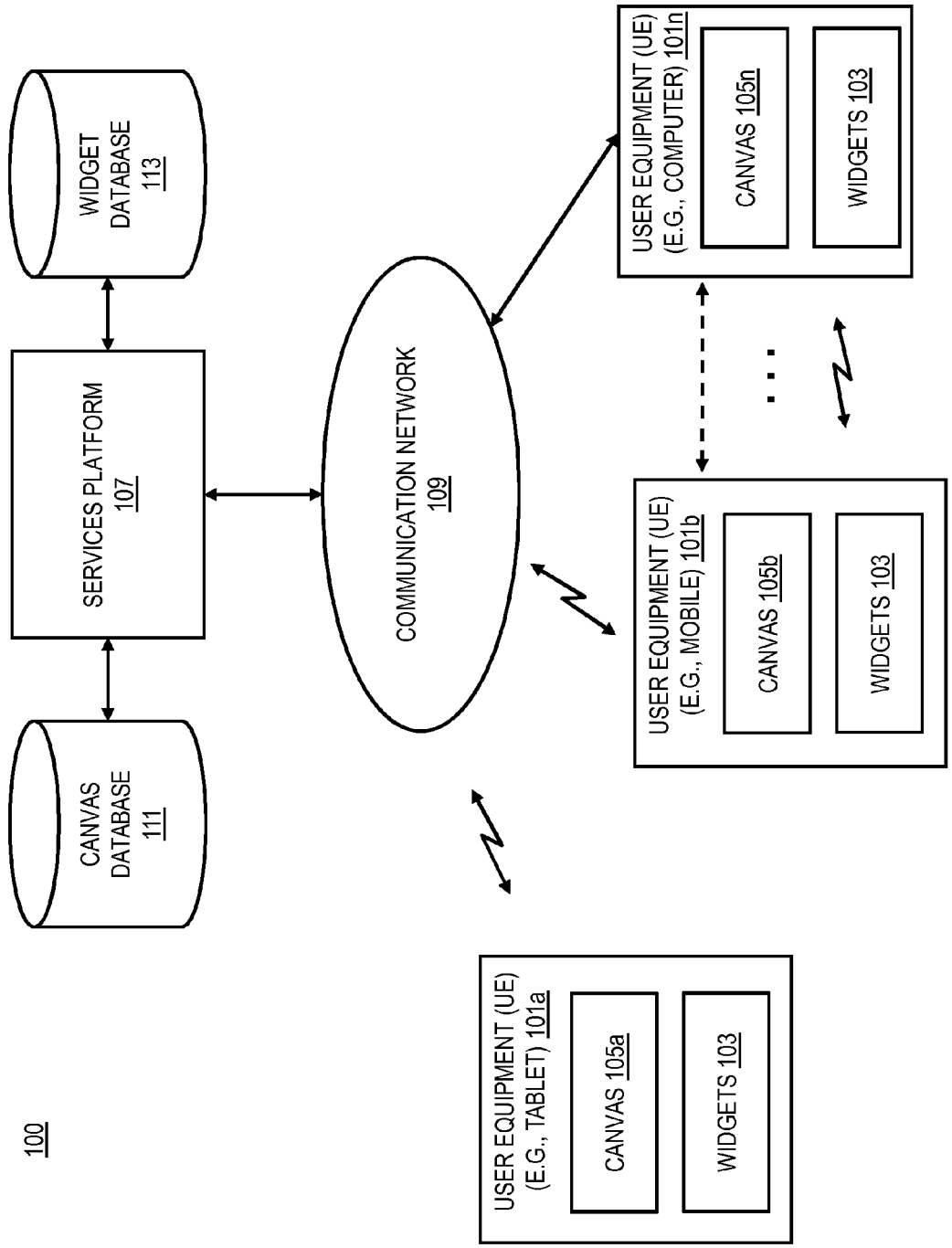
FIG. 1 is a diagram of a system capable of utilizing widgets that are compatible with multiple platforms, according to one embodiment.

FIG. 1 is a diagram of a system capable of utilizing widgets that are compatible with multiple canvases, according to one embodiment. In certain embodiments, as used herein, the term canvas refers to device platforms that can be utilized to execute and present one or more widgets to users of devices. Canvases can come in different forms such as web canvases, mobile canvases, software suite canvases (e.g., applications on a desktop computer), etc. Examples of canvases include interfaces between the widget and the Nokia 560® software platform, Windows®, Linux®, Maemo software platform, MeeGo software platform, web based software platforms, etc. In certain embodiments, the term "canvas" refers to an interface between a widget and an underlying platform. As such a different canvas can be associated with a canvas associated with a different underlying platform.

In certain embodiments, a widget is a stand-alone application or software object that can be embedded into third party sites, be utilized on desktops, on mobile devices, etc. Moreover, a widget can include portable code that can be installed and executed within any separate web page by an end user without requiring additional compilation. Web widgets can use different programming languages and techniques, such as Dynamic HyperText Markup Language (DHTML), JavaScript®, Adobe Flash®, Flash Lite®, Python, C++, etc.

Examples of widgets used include web widgets that may be placed on a personal computer desktop, a sidebar on a desktop, etc. such as weather widgets, time widgets, game widgets, media widgets, social networking widgets, task list managers, etc. A software object is a data structure that includes data that describes the state of a process that executes on a processor and includes instructions for exchanging data with or changing the state of the process. A widget can be a software object with a graphical user interface for interacting with a human user of a device and/or with an application programming interface for interacting with a backend process on a remote network node. By way of example, widgets can be light-weight applications based on standard web technologies (e.g., web runtime (WRT)—a web application runtime environment included in many browsers), that serve as frontends or clients to web-based or other content.

Generally, widgets and applications are customized to the canvas that the widget is used upon. For example, a desktop widget will likely be customized to use a keyboard and mouse input user interface while a widget on a mobile device may be customized to use a touch screen interface. As such, different versions of widgets are used for different types of devices and/or canvases. These different versions of widgets are necessary because a widget coded for one canvas is customized and/or optimized for that canvas. For example, a widget for a desktop suite canvas may have optimizations for a particular type of processor set and/or graphical user interface (GUI) optimizations for a large screen resolution while a widget for a mobile device canvas may have optimizations for another processor type (e.g., one that saves energy) and provides a GUI for a smaller screen. Because of these different types of customizations for widgets, a user has to download and install different versions of widgets on the desktop canvas than from other device canvases (e.g., a tablet canvas, a mobile device canvas, a web canvas, etc.). This can be time consuming because the user may be required to search and download a similar widget, if available, and install the similar widget on the other device canvas. Further, a user with a plurality of devices using widgets may have many widgets performing the same function across canvases, but may be unable to optimally use the widgets because the widgets may not be compatible and/or synchronized across the canvases.

To address this problem, a system 100 of FIG. 1 introduces the capability to utilize widgets that are compatible with multiple canvases or platforms. As such, a single widget file or a small set of widget files can be used on one or more user equipment (UEs) 101a-101n. Further, a framework or interface may be installed on each of the UEs 101 to allow for the use of the widgets 103. Each of the UEs 101 may include a canvas 105 that can interface with an operating system or device hardware associated with the UEs 101. For example, a browser canvas 105 can implement a runtime environment compatible with the widget 103, a tablet operating system or application canvas 105 of a tablet (e.g., UE 101a) can implement a runtime environment compatible with the widget 103, a mobile operating system (e.g., using the Nokia S60® operating platform) canvas 105 of a mobile device (e.g., UE 101b) can implement another runtime environment compatible with the same widget 103, and a computer operating system of a computer (e.g., UE 101n) can implement a runtime environment (e.g., via a framework, software suite, etc.) compatible the widget 103. The runtime environment canvases 105 may be integrated with the operating system of the UEs 101 or be another application (e.g., a desktop interface application, a sidebar application, etc.).

To be able to execute the same widget on multiple canvases 105, each of the runtime environment canvases 105 can be compliant to one or more standards. These standards can include a master code for the widgets 103 to be the same for each of the canvases 105 while allowing for some customizations that can be triggered at the canvas 105. For example, the widget may include a switch statement for user interface or processor optimization options that can be selected based on the canvas 105 executing the widget. As such, a touch screen device can use a different method of input and manipulation of a GUI interface associated with the widget 103 than a desktop device. With the install of canvases 105 on different platforms, widgets 103 can be more easily deployed to the market full of UEs 101 with the compatible canvas 105, more easily discovered by users who can download, send, etc. the widget 103 from various platforms, and more easily developed and delivered because the widget 103 need only be developed and/or updated once to make the widget 103 available. In this manner, costs for development can be reduced because developers need not develop separate widgets for each of the canvases 105.

In certain scenarios, the canvases 105 of the UEs 101 can be installed on the UEs 101 when the UEs 101 are purchased or acquired or via external media. In other scenarios, the canvases 105 can be installed as a package from a services platform 107 via a communication network 109. The services platform 107 may include a canvas database 111 with information, such as canvas modules and/or installation files.

When the user installs a canvas 105 to the user's UE 101, the canvas 105 can determine the functionality of the UE 101 (e.g., detect operating system, detect user interface options, detect screen size and/or resolution, detect processor and/or other hardware types, etc.). The canvas 105 may additionally include selection options to choose code of a widget 103 or link/improve/optimize a widget's functionality using the canvas 105.

In certain embodiments, the user of the UEs 101 (e.g., UE 101n) can download a widget 103 from a widget database 113 associated with the services platform 107 or otherwise obtain a widget (e.g., from another UE 101, external media, etc.). The user can then evaluate the widget 103 on the user's canvas 105n. In certain embodiments, the UE 101 may request and receive a preview of the widget 103 before evaluating the widget 103. The preview may be a snapshot of the widget 103 being executed and/or a corresponding widget (e.g., a demo) with limited functionality. If the user likes the widget 103, the user may decide to transfer the widget 103 to another UE (e.g., UE 101b). As previously noted, the other UE 101b can include another canvas 105b from the canvas 105n associated with another platform different than the platform of UE 101n.

As such, the UE 101n can receive a request to transmit the widget 103 to the other UE 101b associated with the other canvas 105b. As previously noted, the other canvas 105b includes a different runtime environment and/or platform than the runtime environment of the canvas 105n of the UE 101n. The request can be an input for selecting the widget 103 from among one or more available widgets 103 on the UE 101n. These widgets 103 can be presented to the user via a GUI. Further, the presentation can include information about a connection to the other UE 101b. The connection to the other UE 101 can include a wired connection (e.g., a Universal Serial Bus (USB) connection, an IEEE 1394 interface connection, a parallel connection, a serial connection, etc.), a wireless connection (e.g., a Bluetooth® connection, a near field communication connection, a wireless local area network connection, etc.), a connection via the communication network 109 (e.g., via a secure port, tunneling, etc.), etc.).

Additionally, the input selecting the widget 103 can include a drag and drop function to quickly and easily add the widget 103 to the other UE 101b.

When the input is received, the UE 101n can determine a compatibility of the widget 103 with the runtime environment of the other UE 101b and other canvas 105b. The other canvas 105b can provide information during the connection regarding the capabilities of the other canvas 105b (e.g., via sending a version number or other information that the canvas 105b is present on the UE 101b). As such, in certain embodiments, the other UE 101b need not be presented if the other canvas 105b is not compatible. Further, in certain scenarios, the other information can include information that the canvas 105b is compatible with widgets 103. In these scenarios, any canvas 105 that is compatible with widgets 103 can be compatible with any widget 103 or a particular set of widgets (e.g., widgets created before a certain date, widgets signed with a certain signature, widgets with particular version numbering, etc.). Then, the widget 103 can be transferred to the other UE 101b. In this manner, the user of the UE 101n can quickly and easily transfer the widget 103 to another UE 101 belonging to the user or to another user. An advantage of the system 100 is the ability to code a single widget 103 file and be able to use the widget 103 across multiple platforms. As such, the system includes a means for executing a widget 103 via canvases 105 across different platforms.

In certain examples, the system 100 can additionally account for one or more accounts associated with the widgets 103. In this manner, the UE 101n can determine whether the canvas 105n and the other canvas 105b are associated with a common account. This can be determined by receiving account information (e.g., a signature, username and password, etc.) from the other UE 101b and verifying the account information at a services platform 107 or at the UE 101n. Further, the UE 101n can determine whether the user has a license to distribute the widget to the other UE 101b. This can be based on licensing information that can be retrieved from the services platform 107. If the UEs 101 belong to the same account or the user would like to link the widgets 103, another file including linking information (e.g., account information, Bluetooth® pairing information, etc.) can additionally be transmitted with the widget 103. In certain embodiments, the transfer of the widget 103 links the UEs 101 for that widget 103.

By way of example, use of widgets 103 associated with a user can be updated simultaneously using an account or other linking mechanism, such as a USB connection and/or a Bluetooth® connection. With this approach, state information from the widget 103 can be transmitted and/or synchronized between canvases 105 of the user. As such, the widget 103 can execute on both canvases 105 and when one canvas (e.g., canvas 105n) detects a change in state information (e.g., the user adds user information to the widget 103), the UE 101n can store the state information in a memory and cause, at least in part, transmission of the state information to the other canvas (e.g., canvas 105b). With this approach, the other canvas 105b can then utilize the state information to replace and/or update the state information of the widget 103 executing on the other UE 101. In some embodiments, this state transfer can be caused based on a detection of a link between the UEs 101 (e.g., when a wireless connection is available between the UEs 101). In other embodiments, the UEs 101a-101n can be linked to the services platform 107 via the communication network 109. When a UE 101 informs the services platform 107 of the state information, the services platform 107 can distribute the information to all UEs 101 linked (e.g., via an account). Separate services platforms 107 can be used to download the widgets, download canvases, and/or download or synchronize state information, etc.

UEs 101, canvases 105, and/or widgets 103 executing on UEs 101 can be linked via various methods. One method includes linking each UE 101 to an account serviced by a server (e.g., services platform 107). The server can establish links between UEs 101 based on one or more accounts. These links can be set up manually by the user (e.g., via a user interface on one or more of the UEs 101). Further, links may be set up automatically when a user adds a widget 103 to another UE 101 while the account is active. Another method includes linking each UE 101 locally to other UEs 101. As such, the canvas 105 and/or other UE 101 memory includes a parameter to search for certain UEs 101 (e.g., via an identifier of the UE 101). When the UEs 101 are connected, the link can be established and synchronization can occur. This may additionally be manually configured via a user interface or automatic based on utilizing a user interface to transmit a widget 103 between UEs 101. One advantage to the system 100 is that state information associated with widgets 103 can be securely updated. Thus, the system 100 includes means for securely updating state information based on UE 101 links.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UEs 101 and services platforms 107 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the widgets 103 and the services platform 107 may interact according to a client-server model. According to the client-server model, a client process sends a message including a request to a server process, and the server process responds by providing a service (e.g., maps, games, shopping, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
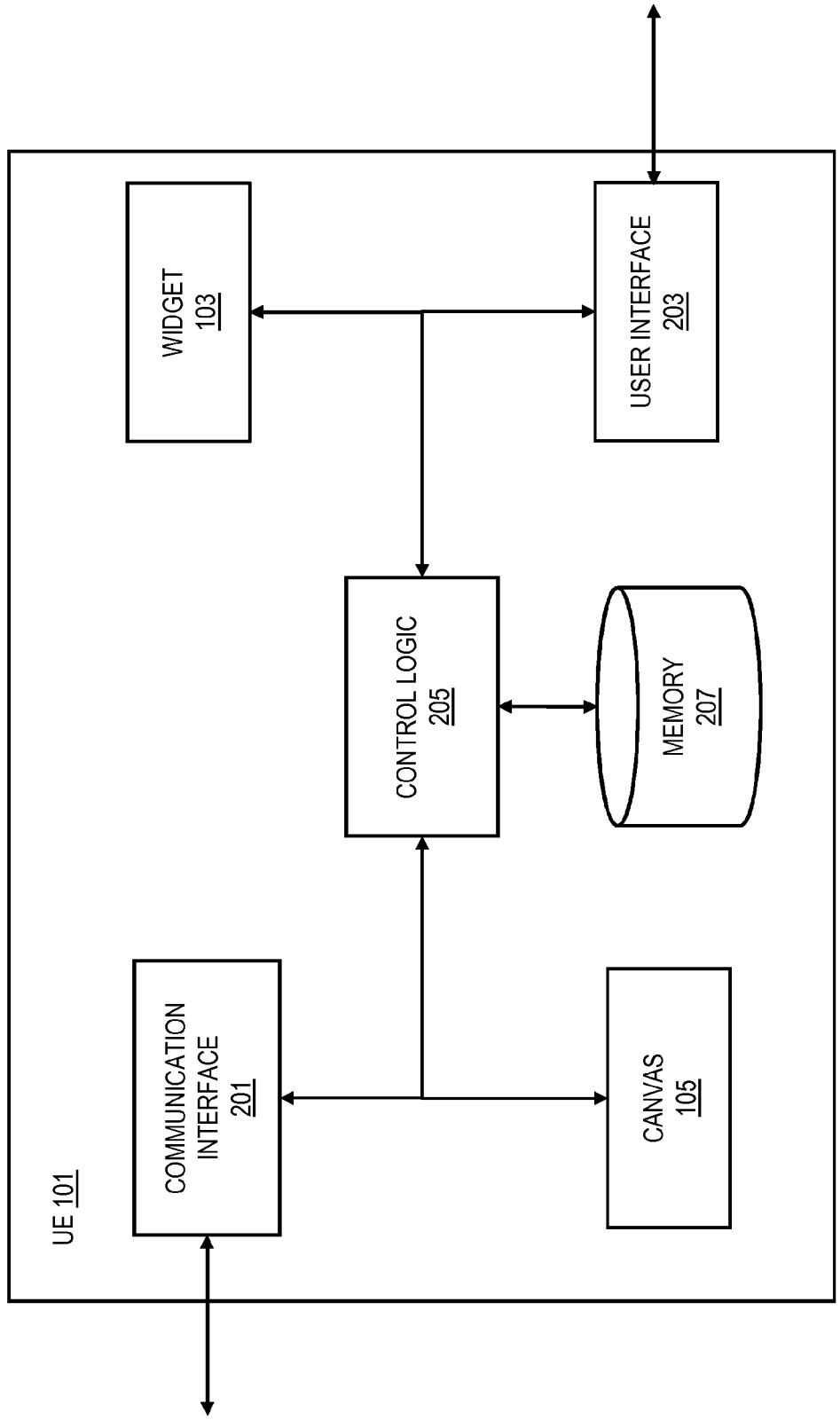
FIG. 2 is a diagram of the components of user equipment capable of executing widgets, according to one embodiment.

FIG. 2 is a diagram of the components of user equipment capable of executing widgets, according to one embodiment. By way of example, the UE 101 includes one or more components for providing a runtime environment to allow execution of compatible widgets. It is contemplated that the functions of these components may be combined in one or more components or performed by other components of equivalent functionality. In this embodiment, the UE 101 includes a communication interface 201, one or more widgets 103, a user interface 203, a canvas 105, control logic 205, and a memory 207.

In one embodiment, the communication interface 201 can be used to communicate with the services platforms 107, other UEs 101, or other devices on the communication network 109. Certain communications can be via methods such as an internet protocol, messaging, or any other communication method (e.g., via the communication network 109, USB, Bluetooth®, etc.). In some examples, the UE 101 can send a query or a request to utilize services (e.g., to upload and/or download state information, application services, etc., download new canvas updates, new widgets 103, etc.) to a services platform 107 via the communication interface 201. The services platform 107 can then perform a requested operation and cause, at least in part, transmission of a response including the requested information. Further, the services platform 107 can receive state information from one UE (e.g., UE 101*a*) and cause transmission of an update to another UE (e.g., UE 101*n*) based on a link between the UEs 101. This link can be stored in a database associated with the services platform 107 and can be account based (e.g., a user can link multiple UEs 101 to a single account). Further, the communication interface 201 can be used to download or otherwise acquire widgets 103 from other UEs 101 and/or services platforms 107. When a widget 103 is downloaded, it can be stored in the memory 207 (e.g., a static memory or a dynamic memory associated with the UE 101). Moreover, the widget 103 can be transferred to other UEs 101 (e.g., via the aforementioned approaches).

The user interface 203 can include various methods of communication. For example, the user interface 203 can have outputs including a visual component (e.g., a screen), an audio component, a physical component (e.g., vibrations), and other methods of communication. User inputs can include a touch-screen interface, a scroll-and-click interface, a button interface, a microphone, etc. Further, the user interface 203 can be used to display one or more widgets 103 to users. Different formats of presentation can be used to present widgets 103 executing on UEs 101 of different platforms and/or using different canvases 105.

Widgets 103 can be executed using a canvas 105 that can interface with an operating system, hardware, or another application to run the widgets on the UE 101. As noted above, different UEs 101 can have a different canvas 105 based on the type of UE 101 and platform associated with the UE 101. As such, the framework for the various UEs 101 can be different when interfacing with the UE 101 components, but the same or similar when interfacing with a widget 103. With this approach, the same widget file can be used across UEs 101. Additionally, this allows for quick resolutions of compatibility issues across platforms (e.g., a UE 101 is compatible with a widget 103 if the canvas 105 is included in the UE 101.

The canvas 105 loads widgets 103 for execution on the UEs 101. Control logic 205 can be used on some of the UEs 101 to execute the widgets 103 (e.g., via the canvas 105) and/or perform other functions on the UE 101. During the execution of a widget 103, the control logic 205 and/or widget 103 can poll for a connection to another UE 101, services platform 107, or other server to determine if another UE 101 is linked with the widget 103. A widget 103 can become associated with a UE 101 when the widget is added to a UE 101. For example, this can occur when the user of the UE 101 logs the UE 101 into an account during the transfer of the widget 103. With this approach the widget 103 on the other UE being transmitted the widget 103 can be associated or linked with the widget 103. For example, a phone number, other identifier of the UE 101 (e.g., a Bluetooth® identifier, International Mobile Equipment Identity (IMEI), etc.), a username and password, etc. can be used to link UEs 101 and/or widgets 103 executing on UEs 101 together.

Figure 3B:
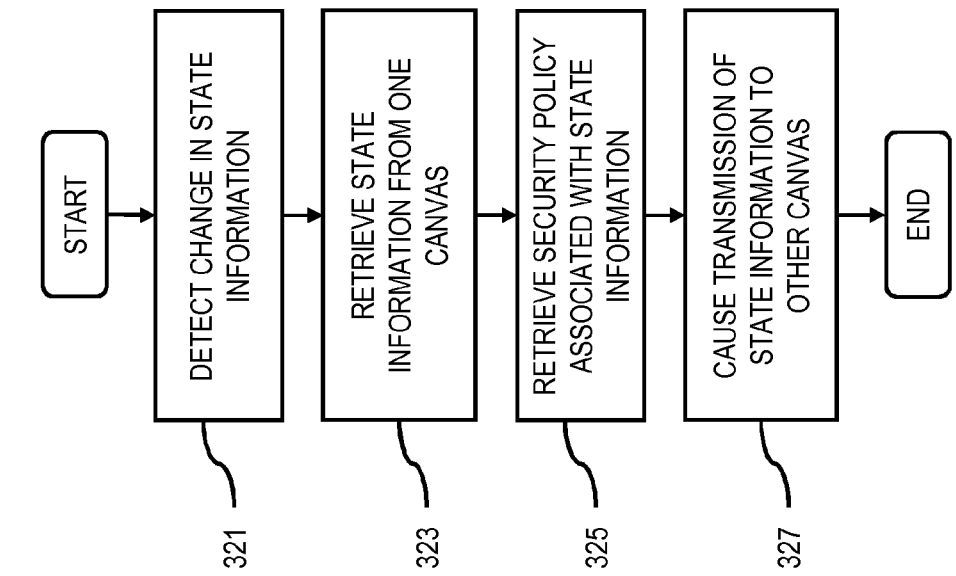
FIG. 3B is a flowchart of a process for updating state information for a widget executing on multiple canvases, according to one embodiment.
Figure 3A:
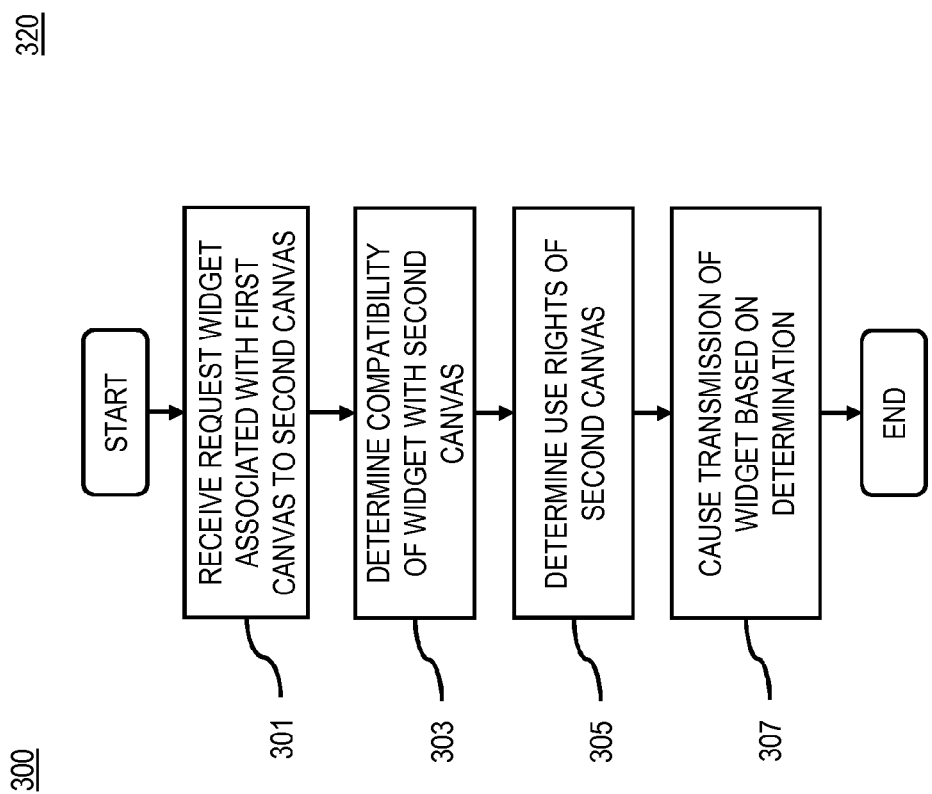
FIG. 3A is a flowchart of a process for utilizing a widget that is compatible with multiple canvases, according to one embodiment.

FIG. 3A is a flowchart of a process for utilizing a widget that is compatible with multiple canvases, according to one embodiment. In one embodiment, control logic 205, the canvas 105, and/or widget 103 or other application performs the process 300 and is implemented in, for instance, a chip set including a processor and a memory as shown FIG. 6. As such, the control logic 205, canvas 105, and/or widget 103 of the UE 101 can provide means for accomplishing various parts of the process 300 as well as means for accomplishing other processes in conjunction with other components of the UE 101 and/or services platform 107. For simplicity, the control logic 205 of the UE 101 is used to describe the process 300, but it is noted that other processes or modules of the UE 101 can perform the process 300.

A user can utilize a widget 103 on the user's UE (e.g., a first UE 101*a*). The first UE 101*a* may include a first canvas 105*b* and include a widget 103 in memory 207. The widget 103 can be executed via the canvas 105. The user of the widget 103 may enjoy the widget 103 and decide that the user wishes to copy the widget to another UE 101 that the user owns or send a copy to a friend. The user can enter input in to the UE 101 via the user interface 203 to conduct a search for other UEs 101. The search can include one or more parameters (e.g., e-mail address, account identifier, local wireless search for devices, a local search for connected devices, etc.) to find the other UEs 101. The search results can include a second UE 101*b* with a second canvas 105*b*. The second canvas 105*b* can be associated with a platform different from the first canvas 105*a*. For example, the first canvas 105*a* can be associated with a desktop computer running a particular operating system and the second canvas 105*b* can be associated with a Nokia S60® platform, another mobile phone platform, a tablet platform, etc.

At step 301, the control logic 205 receives a request to transmit the widget 103 associated with the first canvas 105*a* to the second canvas 105*b*, the first canvas 105*a* and the second canvas 105*b* including a respective runtime environment. The request can be in response to a presentation made via the UE 101. As such, the control logic 205 causes, at least in part, presentation of one or more widgets available in the first canvas 105*a* to the user. An example of the presentation is provided in FIG. 4B. In response to the presentation, a request input is received for selecting the widget 103 from among the one or more available widgets. This can be a simple drag and drop motion, a selection of the widget 103 and then a selection of the second UE 101*b*, etc.

At step 303, the control logic 205 determines a compatibility of the widget 103 with the runtime environment of the second canvas 105*b*. In certain embodiments, the second UE 101*b* is not found as a search result if the UE 101*b* is not compatible with widgets 103. The compatibility can be checked by determining whether a second canvas 105*b* is present, determining that a required signature is present in the second canvas 105*b*, determining a version level of the second canvas 105*b*, etc. If the canvas 105*b* is determined to be on the second UE 101*b* and compatible, the control logic 205 can cause transmission of the widget 103 to the second UE 101*b*.

This transmission can be based on rights associated with the user, first UE 101*a*, and/or second UE 101*b* or components thereof. The control logic 205 can determine use rights of the second canvas 105*b* to access the widget 103 (step 305). The rights can be stored with the widget 103 (e.g., in a portion of the widget 103 that can be read by the first canvas 105*a*), stored in the memory 207, or requested from the services platform 107. As part of determining use rights of the second canvas 105*b*, the control logic 205 determines whether the first canvas 105*a* and the second canvas 105*b* are associated with a common account. The common account information can be requested from the services platform 107. The determination can be accomplished by receiving authentication information from the second canvas 105*b* and transmitting that information to the services platform 107 to determine rights. Further, rights information can be associated with the widget 103. For example, the widget 103 can include self-authentication and/or a parameter defining access rights. Moreover, the determination of use rights of the second canvas 105b can include retrieving licensing information, authentication information, or a combination thereof associated with the common account and/or other rights information. Then, at step 307, the control logic 205 causes, at least in part, transmission of the widget based, at least in part, on the determination. As noted, the transmission can be determined based on rights associated with the canvas 105, widget 103, and/or user. Further, the widget 103 can include a file that can be executed via different canvases 105 in different runtime environments (e.g., a mobile runtime environment, a tablet runtime environment, a desktop runtime environment, a web-based runtime environment, etc.). Thus the different runtime environments can execute a common code set from the widget file.

FIG. 3B is a flowchart of a process for updating state information for a widget executing on multiple canvases, according to one embodiment. In one embodiment, canvas 105, and/or widget 103 or other application/control logic performs the process 320 and is implemented in, for instance, a chip set including a processor and a memory as shown FIG. 6. As such, the canvas 105, and/or widget 103 of the UE 101 can provide means for accomplishing various parts of the process 320 as well as means for accomplishing other processes in conjunction with other components of the UE 101 and/or services platform 107. For simplicity, the canvas of the UE 101 is used to describe the process 320, but it is noted that other processes or modules of the UE 101 can perform the process 320.

The control logic 205 of a UE 101a can be caused to load a canvas 105a to run a widget 103. The widget 103, canvas 105a, and/or UE 101a can be linked with one or more other UEs 101 (e.g., UE 101b) and/or canvases 105 (e.g., canvas 105b). Information about the linking can be stored in a memory 207 of the UE 101 or at a services platform 107. For example, the memory 207 can include a list of UEs 101 previously connected to the UE 101a and/or be manually updated (e.g., by entering identifiers of one or more UEs 101). As the user uses the widget 103, the widget 103 can be updated with information and change states.

At step 321, the control logic 205 detects a change in state information of the widget 103 in a second canvas 105b. A change of state occurs when particular information associated with the widget 103 changes. In certain embodiments, the particular information is information that can be updated by the user, updated via a process of the control logic 205, is used to configure the widgets, includes user data, contextual information, or other information associated with the user, or a combination thereof. For example, the particular information for a task scheduler can be one or more tasks and/or times associated with the particular tasks. In this scenario, the second canvas 105b and/or control logic 205 associated with the second canvas 105b is additionally executing the widget 103. A register associated with the UE 101 can be updated when new state information is accessed.

Then, at step 323, the control logic 205 retrieves changed state information. The control logic 205 can then determine whether any UEs 101 are linked to the first canvas 105a and/or widget 103 executing on the first canvas 105a. In certain embodiments, the change in state information can be detected in a recognition process. The recognition process can include detecting a connection between the first canvas 105a and the second canvas 105b. The connection may be wired or wireless connection including a tunnel connection over the communication network 109.

The first canvas 105a generates a message to send to the second canvas 105b and/or services platform 107 (which can be forwarded to the second canvas 105b) that the state has been changed. Then, a message is received at the control logic 205 of the first UE 101a that the state information has been changed.

In certain embodiments, the control logic 205 can further retrieve a security policy associated with the state information (step 325). In this manner, the control logic 205 can retrieve a security policy associated with the transmission of the state information. The security policy can include a signature, another form of authentication (e.g., a username/password set, a key based authentication, an encoding/decoding approach, etc.), or the like. Thus, the first canvas 105a can request that the second canvas 105b provide authentication information before sending the state information or encode the state information before sending the state information to the second canvas 105b.

At step 327, the control logic 205 causes, at least in part, transmission of state information to the second canvas 105b. The second UE 101b can then receive the state information, decode the state information (if necessary), and use the state information to update the state of the widget 103 executing on the second canvas 105b. The control logic 205 causes, at least in part, enforcement of the security policy in connection with the transmission of the state information. The enforcement of the security policy can be completed by authenticating at the first canvas 105a, encoding at the first canvas 105a and decoding at the second canvas 105b, etc.

The above process 320 describes the updating of state information between two canvases. It is noted that the updating of state information can be from any linked UE 101a-101n to any other linked UE 101a-101n.

Figure 4B:
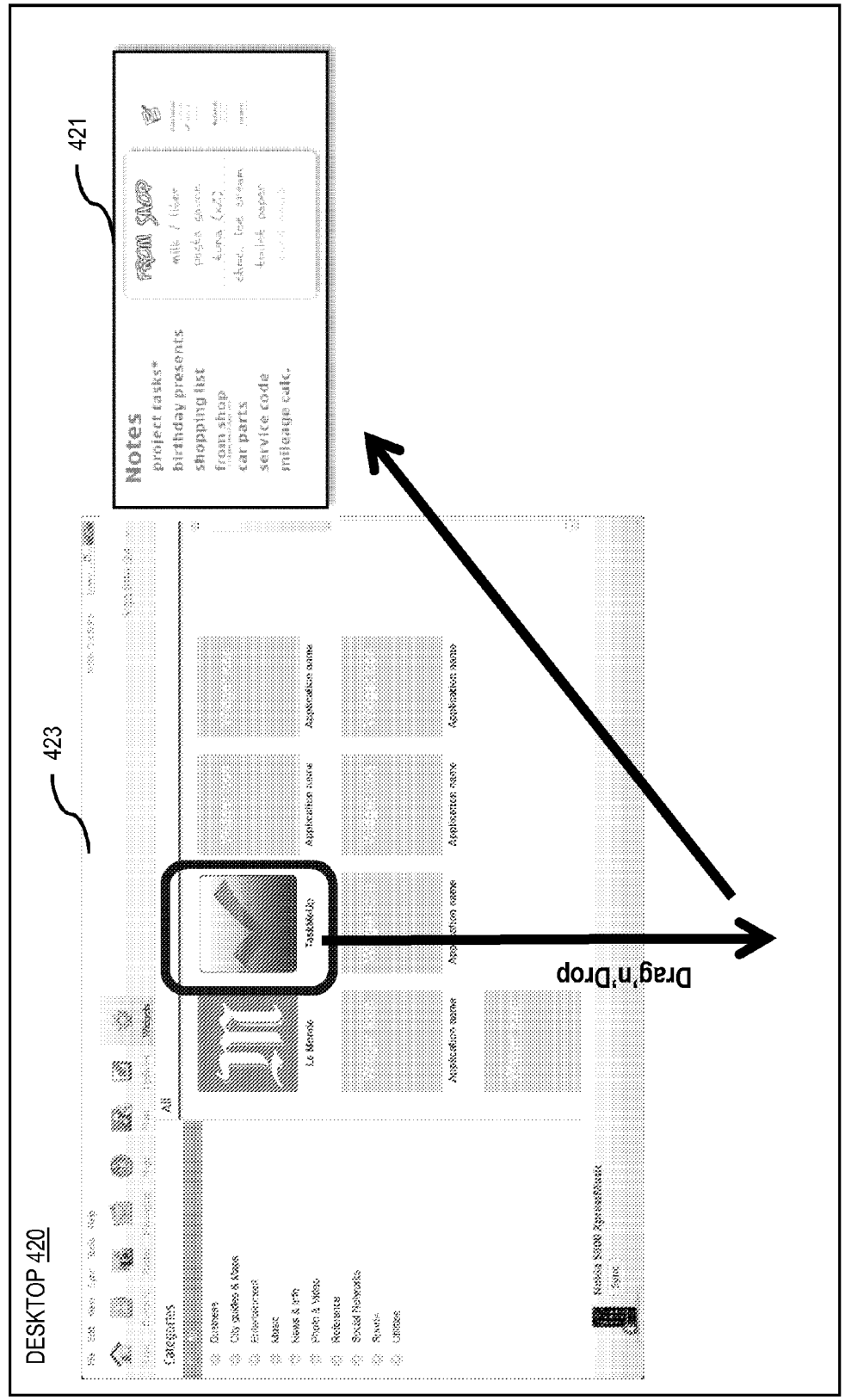

FIGS. 4A-4D are diagrams of user interfaces utilized in the processes of FIGS. 3A and 3B, according to various embodiments. FIG. 4A shows three user interfaces 401, 403, 405. The first user interface includes a browser user interface 401 that includes presentation of a widget 407. Further, the browser user interface 401 may additionally include additional widgets as well as other content. The desktop user interface 403 can include a desktop with icons and/or other widgets presented. Further, the desktop can include a widget 409 that is linked to the widget of the browser user interface 401 and a widget 411 of a mobile user interface 405. In one example, the widgets 407, 409, 411 on each platform include the same widget code. Further, the widgets 407, 409, 411 can be synchronized. In one example, the widget 407, 409, 411 is for a task list. When one of the widgets 407, 409, 411 is updated, the other widgets 407, 409, 411 are additionally updated. As noted in process 320, this update of state information can be based via a connection to a server coordinating the use of the widgets 407, 409, 411 or via a proximity based connection (e.g., a direct connection via USB, Bluetooth®, etc.). As shown, the widgets 407, 409, 411 can show the same or similar information, but have different or the same user interface features (e.g., color, placement of user interface elements (e.g., list categories, numbers of items to purchase, etc.).

FIG. 4B shows a desktop user interface 420 that allows for the execution and presentation of a widget 421. As noted earlier, the desktop user interface 420 can include a canvas that allows for the presentation of the widget on the desktop. In this manner, the widget 421 is seamlessly presented on the desktop. In one embodiment, desktop includes a program 423 that allows for coordinating widgets. This program 423 can include a browser, an application for dealing with widgets, etc. Further, the user may use a drag and drop motion from the program to the desktop to initiate the use of the widget 421 on the desktop. Moreover, after the drag and drop motion, the widget 421 can then on be presented on the desktop. As previously detailed, the desktop can include a canvas that interfaces the widget 421 with the operating system/hardware to allow for execution of the widget 421.

Figure 4C:
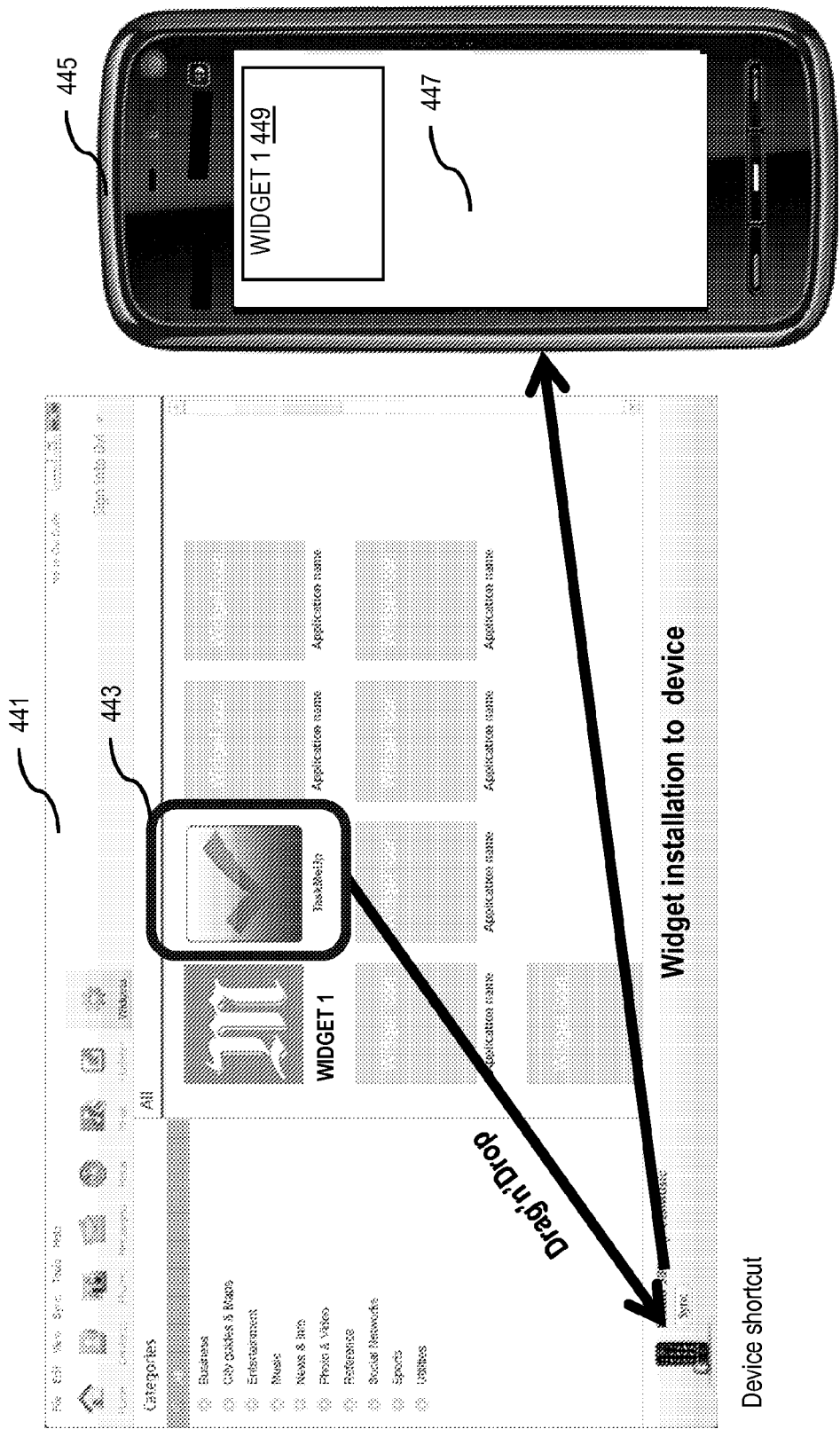

Further, as shown in a user interface 441 of FIG. 4C, the user can additionally drag and drop a selected widget 443 to install the selected widget 443 onto a connected device. The device 445 can be shown in the user interface 441 as an option to synchronize and/or add widgets. The device 445 may be connected via a local connection (e.g., a wired connection such as USB and/or wireless connection such as a Bluetooth® connection). Further, the device 445 may be searched for and connected via another connection (e.g., over the communication network 109 to the device 445). The user interface 447 of the device 445 could be executing and showing one or more widgets (e.g., widget 1 449). Further, in certain scenarios, the installation of the widget 443 can include popping up (not shown) on the user interface 447. In other scenarios, the widget 443 can be added as an option to execute on the device 445 when the user of the device 445 chooses.

Figure 4D:
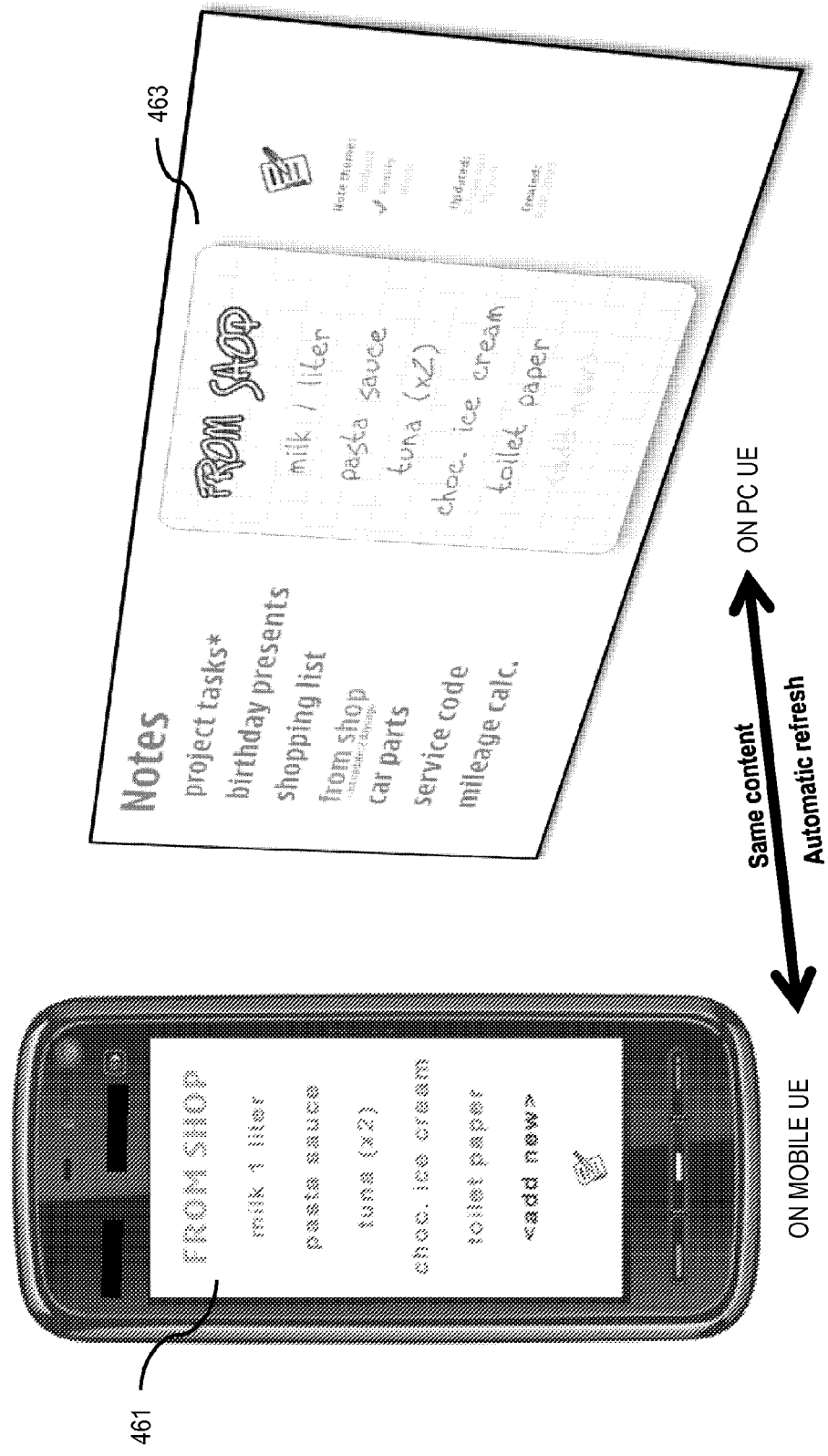

FIG. 4D shows user interfaces 461, 463 showing execution of a widget. As noted previously, the widget can be the same file executing on different canvases and/or platforms. Further, a first user interface 461 may be of a mobile UE with a particular presentation. The presentation can be determined by a canvas used on the UE. For example, style sheets and/or other options may be used to change or modify presentation of the widget on respective canvases. As such, the second user interface 463 can be executing the same widget with different visible options and/or presentation.

With the above approaches, canvases 105 can be used to allow for the execution of a widget across different platforms. As such, a widget need only be coded once to be utilized on multiple platforms. Further, the ability to run a single widget across platforms allows for the UE 101 to send a widget to another UE 101 without need for complex compatibility checks. The UE 101 can simply check for compatibility of another UE 101 by determining that a canvas exists on the other UE 101. This allows for saving in communication bandwidth as well as processor time of the UEs 101. Further, the security policies can be used in the exchange of widgets to determine whether the widget should be transmitted to the other UE 101 or whether the other UE 101 should receive state information associated with a widget executing on the UE 101. With this approach, the state information can be encoded/decoded so that only UEs 101 with proper permissions receive updated state information.

The processes described herein for providing utilization of widgets compatible with multiple platforms may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
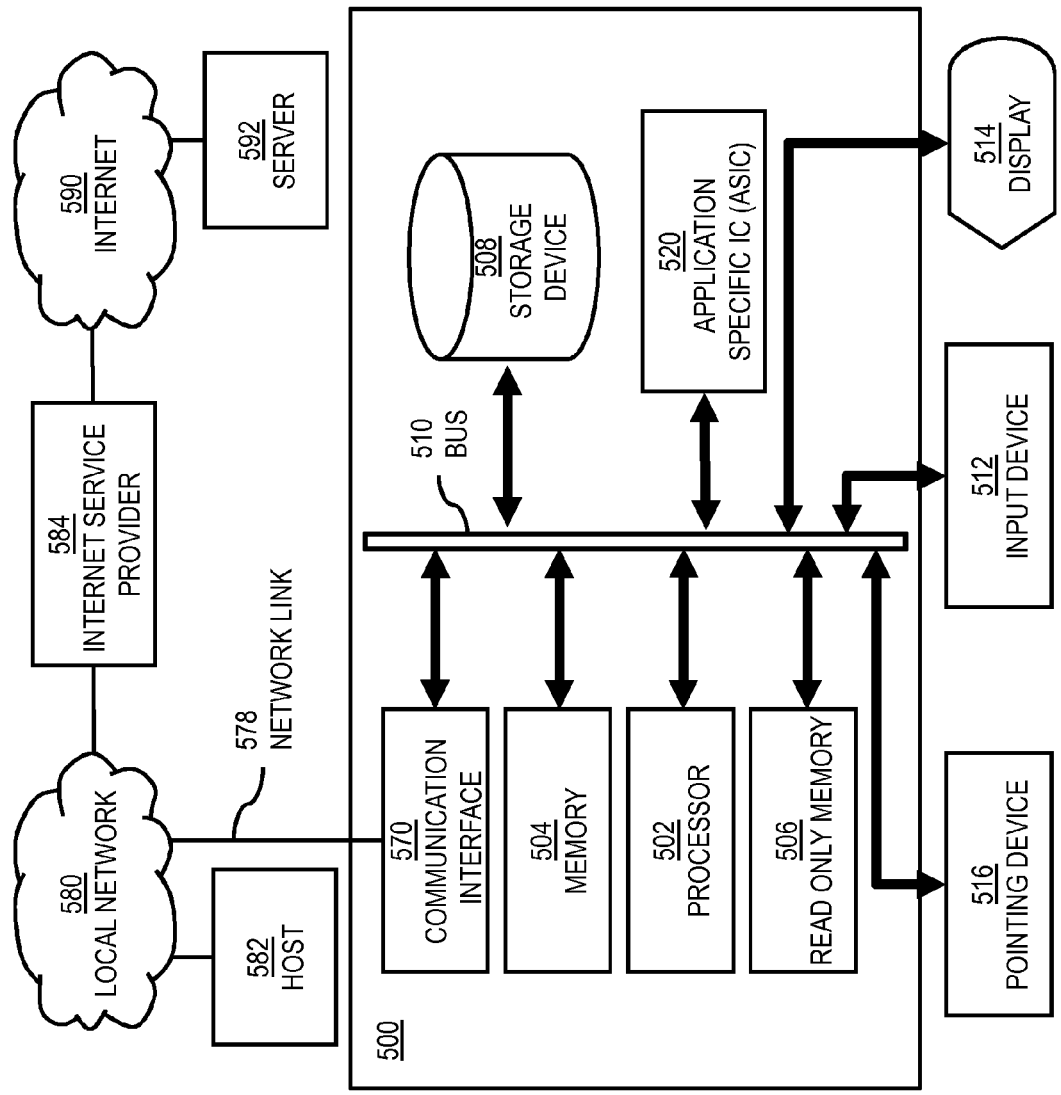
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to utilize widgets compatible with multiple platforms as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of utilizing widgets compatible with multiple platforms.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to utilizing widgets compatible with multiple platforms. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for utilizing widgets compatible with multiple platforms. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for utilizing widgets compatible with multiple platforms, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 109 to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
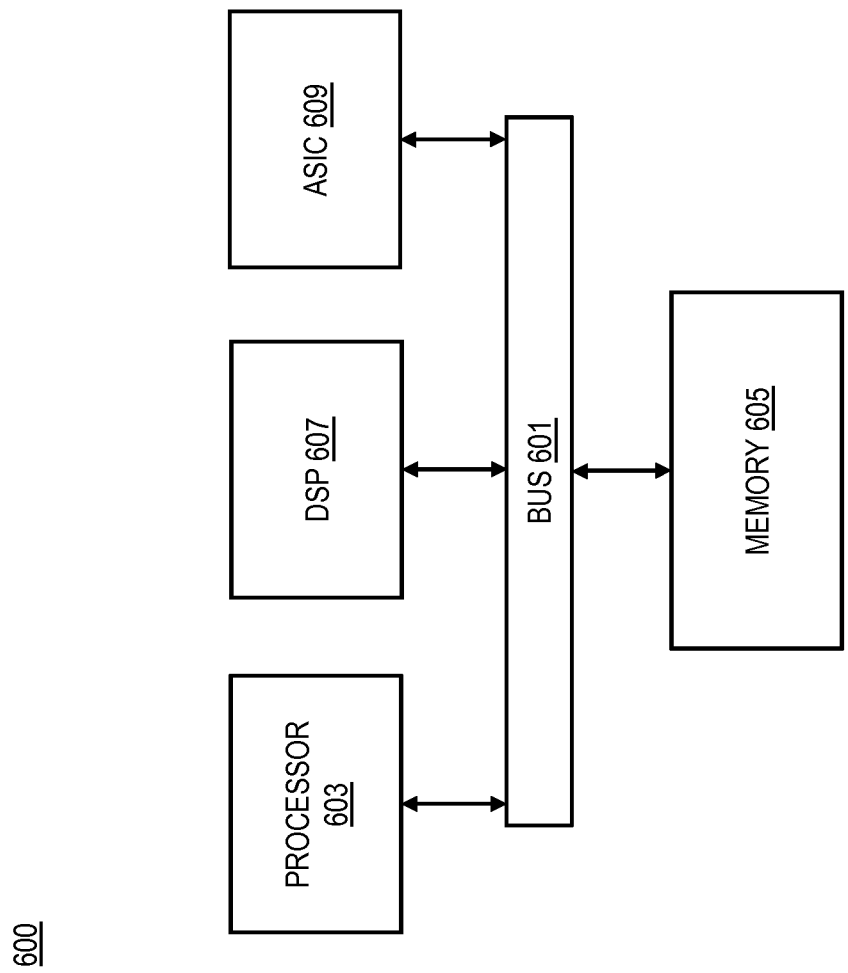
FIG. 6 is a diagram of a chip set that can be used to implement an embodiment of the invention.

FIG. 6 illustrates a chip set or chip 600 upon which an embodiment of the invention may be implemented. Chip set 600 is programmed to utilize widgets compatible with multiple platforms as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of services. Chip set or chip 600, or a portion thereof, constitutes a means for performing one or more steps of utilizing widgets compatible with multiple platforms.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to utilize widgets compatible with multiple platforms. The memory 605 also stores the data associated with or generated by the execution of the inventive steps.

Figure 7:
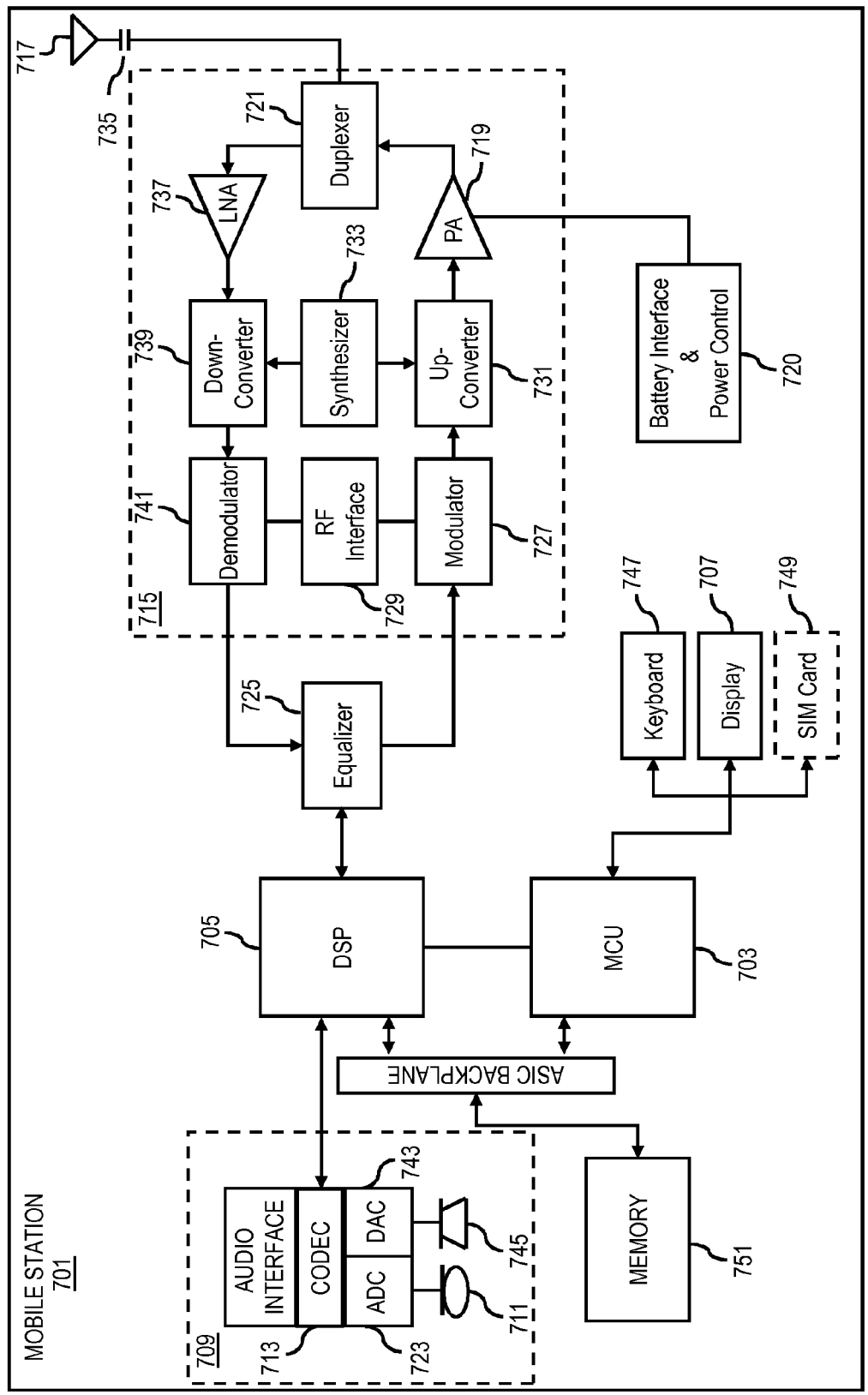
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of utilizing widgets compatible with multiple platforms. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of utilizing widgets compatible with multiple platforms. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to utilize widgets compatible with multiple platforms. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. A method comprising:
receiving a request to transmit a widget associated with a first canvas to a second canvas, the first canvas and the second canvas including a respective runtime environment;
causing, at least in part, presentation of two or more widgets available in the first canvas;
receiving an input for selecting the widget from among the two or more available widgets, wherein the request is based, at least in part, on the input;
determining a compatibility of the widget with the runtime environment of the second canvas;
causing, at least in part, transmission of the widget based, at least in part, on the determination;
retrieving a security policy; and
causing, at least in part, enforcement of the security policy.

2. A method of claim 1, further comprising:
retrieving state information of the widget in the first canvas; and
causing, at least in part, transmission of the state information to the second canvas,
wherein the state information configures the widget in the second canvas.

3. A method according to claim 2, further comprising:
detecting a change in the state information of the widget in the first canvas,
wherein the retrieving of the state information, the transmission of the state information, or a combination thereof is based, at least in part, on the detection.

4. A method of claim 2, wherein the
retrieving of the security policy is associated with the transmission of the state information; and
the causing, at least in part, of the enforcement of the security policy is in connection with the transmission of the state information.

5. A method of claim 2, further comprising:
detecting a connection between the first canvas and the second canvas,
wherein the transmission of the widget, the state information, or a combination thereof is based, at least in part, on the connection.

6. A method of claim 1, further comprising:
determining whether the first canvas and the second canvas are associated with a common account,
wherein the transmission of the widget is further based on the determination with respect to the common account.

7. A method of claim 6, further comprising:
retrieving licensing information, authentication information, or a combination thereof associated with the common account,
wherein the transmission of the widget is further based on the licensing information, the authentication information, or the combination thereof.

8. A method of claim 1, further comprising:
causing, at least in part, presentation of one or more widgets available in the first canvas; and
receiving an input for selecting the widget from among the one or more available widgets,
wherein the request is based, at least in part, on the input.

9. A method of claim 1, wherein at least one of the first canvas and the second canvas includes a web-based runtime environment, a mobile runtime environment, a desktop runtime environment, or a combination thereof, and wherein the web-based runtime environment, the mobile runtime environment, the desktop runtime environment, or the combination executes a common code set of the widget.

10. A method of claim 1,
wherein the two or more widgets are compatible with multiple platforms.

11. An apparatus comprising:
at least one processor; and
at least one memory including computer program code,
the at least one memory and the computer program code configured to, with the at least one processor, cause the apparatus to perform at least the following,
receive a request to transmit a widget associated with a first canvas to a second canvas, the first canvas and the second canvas including a respective runtime environment;
cause, at least in part, presentation of two or more widgets available in the first canvas;
receive an input for selecting the widget from among the two or more available widgets, wherein the request is based, at least in part, on the input;
determine a compatibility of the widget with the runtime environment of the second canvas;
cause, at least in part, transmission of the widget based, at least in part, on the determination;
retrieve a security policy; and
cause, at least in part, enforcement of the security policy.

12. An apparatus of claim 11, wherein the apparatus is further caused, at least in part, to:
retrieve state information of the widget in the first canvas; and
cause, at least in part, transmission of the state information to the second canvas,
wherein the state information configures the widget in the second canvas.

13. An apparatus of claim 12, wherein the apparatus is further caused, at least in part, to:
detect a change in the state information of the widget in the first canvas,
wherein the retrieving of the state information, the transmission of the state information, or a combination thereof is based, at least in part, on the detection.

14. An apparatus of claim 12, wherein the
retrieving of the security policy is associated with the transmission of the state information; and
the causing, at least in part, of the enforcement of the security policy is in connection with the transmission of the state information.

15. An apparatus of claim 12, wherein the apparatus is further caused, at least in part, to:
detect a connection between the first canvas and the second canvas,
wherein the transmission of the widget, the state information, or a combination thereof is based, at least in part, on the connection.

16. An apparatus of claim 12, wherein the apparatus is further caused, at least in part, to:
determine whether the first canvas and the second canvas are associated with a common account,
wherein the transmission of the widget is further based on the determination with respect to the common account.

17. An apparatus of claim 16, wherein the apparatus is further caused, at least in part, to:
retrieve licensing information, authentication information, or a combination thereof associated with the common account,
wherein the transmission of the widget is further based on the licensing information, the authentication information, or the combination thereof.

18. An apparatus of claim 12, wherein the two or more widgets are compatible with multiple platforms.

19. An apparatus of claim 12, wherein at least one of the first canvas and the second canvas includes a web-based runtime environment, a mobile runtime environment, a desktop runtime environment, or a combination thereof, and wherein the web-based runtime environment, the mobile runtime environment, the desktop runtime environment, or the combination executes a common code set of the widget.

20. An apparatus of claim 11, wherein the
   two or more widgets are compatible with multiple platforms.

21. A computer-readable non-transitory storage medium carrying one or more sequences of one or more instructions which, when executed by one or more processors, cause an apparatus to at least perform the following steps:
   receiving a request to transmit a widget associated with a first canvas to a second canvas, the first canvas and the second canvas including a respective runtime environment;
   causing, at least in part, presentation of two or more widgets available in the first canvas;
   receiving an input for selecting the widget from among the two or more available widgets, wherein the request is based, at least in part, on the input;
   determining a compatibility of the widget with the runtime environment of the second canvas;
   causing, at least in part, transmission of the widget based, at least in part, on the determination;
   retrieving a security policy; and
   causing, at least in part, enforcement of the security policy.

22. A computer-readable non-transitory storage medium of claim 21, wherein the apparatus is caused, at least in part, to further perform:
   retrieving state information of the widget in the first canvas; and
   causing, at least in part, transmission of the state information to the second canvas,
   wherein the state information configures the widget the in the second canvas.

23. A computer-readable non-transitory storage medium of claim 21, wherein the
   two or more widgets are compatible with multiple platforms.

* * * * *